(12) United States Patent
Guo et al.

(10) Patent No.: US 11,292,708 B2
(45) Date of Patent: Apr. 5, 2022

(54) AUTOMATIC ISOBARIC DISPENSING MACHINE FOR CRAFT BEER AND BEER DISPENSING METHOD BY USING THE SAME

(71) Applicant: Shenzhen Chiwu Technology Ltd., Guangdong (CN)

(72) Inventors: Peipei Guo, Guangdong (CN); Mengyu Chen, Guangdong (CN); Haifei Zhou, Guangdong (CN); Tianhui He, Guangdong (CN)

(73) Assignee: Shenzhen Chiwu Technology Ltd., Shenzhen (CN)

( * ) Notice: Subject to any disclaimer, the term of this patent is extended or adjusted under 35 U.S.C. 154(b) by 74 days.

(21) Appl. No.: 16/927,935

(22) Filed: Jul. 13, 2020

(65) Prior Publication Data
US 2021/0039940 A1    Feb. 11, 2021

(30) Foreign Application Priority Data

Aug. 5, 2019 (CN) .......................... 201910718925.2

(51) Int. Cl.
*B67D 1/02* (2006.01)
*B67D 1/00* (2006.01)
(Continued)

(52) U.S. Cl.
CPC ............. *B67D 1/02* (2013.01); *B67D 1/0081* (2013.01); *B67D 1/07* (2013.01); *B67D 1/12* (2013.01);
(Continued)

(58) Field of Classification Search
CPC .......... B67D 1/02; B67D 1/0081; B67D 1/07; B67D 1/12; B67D 2001/0093;
(Continued)

(56) References Cited

U.S. PATENT DOCUMENTS 3,878,970 A * 4/1975 Nezworski ........... B67D 1/1245
222/61
5,303,845 A * 4/1994 Osawa ................. B67D 1/1252
222/1
(Continued)

FOREIGN PATENT DOCUMENTS

CN   205032110 U  *  2/2016
CN   105600730 A  *  5/2016
(Continued)

*Primary Examiner* — Vishal Pancholi
*Assistant Examiner* — Bob Zadeh (57) ABSTRACT

Disclosed is an automatic isobaric dispensing machine for craft beer and a beer dispensing method by using the same. The automatic isobaric dispensing machine for craft beer comprises a housing; a beer dispensing head installed on the housing and hermetically placed at a container mouth of a container; a carbon dioxide supplying device connecting with a gas inlet of the beer dispensing head through a pre-pressure gas valve, a beer barrel connected with a beer inlet of the beer dispensing head through a beer outlet valve, a flowmeter for measuring a beer flow of the beer barrel, and a processor connected with the pre-pressure gas valve, the beer outlet valve, the flowmeter, the gas exhaust valve and the barometer. The isobaric dispensing machine has a simple machine structure and is convenient to use, and is capable of reducing the time cost and the beer waste thus providing better beer quality.

8 Claims, 8 Drawing Sheets

(51) Int. Cl.
    *B67D 1/07* (2006.01)
    *B67D 1/12* (2006.01)
    *G06Q 20/20* (2012.01)
    *G07F 17/00* (2006.01)
(52) U.S. Cl.
    CPC ......... *G06Q 20/20* (2013.01); *G07F 17/0014* (2013.01); *B67D 2001/0093* (2013.01); *B67D 2001/075* (2013.01); *B67D 2210/00013* (2013.01); *B67D 2210/00028* (2013.01)
(58) Field of Classification Search
    CPC .... B67D 2001/075; B67D 2210/00013; B67D 2210/00028; B67D 1/0885; B67D 1/0894; B67D 1/1243; B67D 1/1272; B67D 1/1252; B67D 2210/0006; B67D 1/025; B67D 1/08; B67D 1/0829; G06Q 20/20; G07F 17/0014; G07F 13/025
    See application file for complete search history.

(56) References Cited

U.S. PATENT DOCUMENTS

| | | | |
|---|---|---|---|
| 2006/0137383 A1* | 6/2006 | Chiusolo | B67D 1/0864 62/390 |
| 2007/0166431 A1* | 7/2007 | Camitz | C12C 3/12 426/11 |
| 2018/0129360 A1* | 5/2018 | Suh | G07F 13/065 |
| 2021/0039940 A1* | 2/2021 | Guo | B67D 1/12 |

FOREIGN PATENT DOCUMENTS

| | | | | |
|---|---|---|---|---|
| JP | H0853196 A | * | 2/1996 | |
| JP | H0977194 A | * | 3/1997 | |
| WO | WO-2012123768 A1 | * | 9/2012 | ........... B67D 1/0003 |

* cited by examiner

ND BEER
AUTOMATIC ISOBARIC DISPENSING MACHINE FOR CRAFT BEER AND BEER DISPENSING METHOD BY USING THE SAME

CROSS REFERENCE TO RELATED APPLICATIONS

The present application claims the benefit of Chinese Patent Application No. 201910718925.2 filed on Aug. 5, 2019, the contents of which are incorporated herein by reference in their entirety.

TECHNICAL FIELD

The present disclosure relates generally to a beer dispensing machine technical field, and more particularly relates to an automatic isobaric dispensing machine for craft beer and a beer dispensing method by using the automatic isobaric dispensing machine for craft beer.

BACKGROUND

The craft beer always has a high content of carbon dioxide. The traditional beer dispensing machine is filled manually to guarantee a low speed for avoiding the overflow of a large amount of foam. This is time consuming. Moreover, as the temperature and pressure in the pipelines of the beer dispensing machine are both unstable during the first time of beer dispensing for each barrel of beer, the first cup of beer inevitably has a large amount of foam and should be dumped. If the beer dispensing is not continuously, this problem will occur repeatedly in the same barrel of beer, resulting in a waste of about 10% beer for each barrel. When foam is generated during the beer dispensing, the carbon dioxide contained in beer will be released and the reduction of the carbon dioxide will affect the flavor of the beer. In addition, the small craft breweries, bars, as well as individual craft beer enthusiasts, cannot afford large-scale industrial filling production lines, while the manual filling is time-consuming and labor-consuming and beer waste is also large. In general, there are many different tastes of beer in the beer dispensing situation, so a lot of beer dispensing heads should be placed, which increases the machine volume and occupies a large business area, thus increasing the operating cost.

SUMMARY

The object of the present application is to provide an automatic isobaric dispensing machine for craft beer and a beer dispensing method by using the automatic isobaric dispensing machine for craft beer, which has a simple machine structure and is convenient to use and is capable of reducing the time cost and the beer waste, thus providing better beer quality, aiming at the above problem of the prior art.

According to an aspect, an automatic isobaric dispensing machine for craft beer is provided, which comprising a housing and a beer dispensing head installed on the housing and hermetically placed at a container mouth of a container, wherein the beer dispensing head is arranged with a beer inlet, a gas inlet, a gas exhaust outlet for discharging gas in the container, a gas exhaust valve for controlling an opening operation and a closing operation of the gas exhaust outlet, and a barometer for measuring a gas pressure in the container; wherein the automatic isobaric dispensing machine for craft beer further comprises a carbon dioxide supplying device connecting with the gas inlet of the beer dispensing head through a pre-pressure gas valve, a beer barrel connected with the beer inlet of the beer dispensing head through a beer outlet valve, a flowmeter for measuring a beer flow of the beer barrel, and a processor connected with the pre-pressure gas valve, the beer outlet valve, the flowmeter, the gas exhaust valve and the barometer.

In an embodiment of the present application, the automatic isobaric dispensing machine for craft beer further comprises a plurality of beer barrels filled with different tastes of beer, and each beer barrel is provided with one corresponding beer outlet valve at its outlet, the beer dispensing head is connected with each beer outlet valve via a common pipeline with a flowmeter arranged inside; wherein the automatic isobaric dispensing machine for craft beer further comprises a beer selection knob and a capacity selection knob.

In an embodiment of the present application, the automatic isobaric dispensing machine for craft beer further comprises a gas source connected with the common pipeline through a residual gas valve.

In an embodiment of the present application, the automatic isobaric dispensing machine for craft beer further comprises a sterilizing liquid barrel connected with the beer dispensing head through a sterilizing liquid valve.

In an embodiment of the present application, the automatic isobaric dispensing machine for craft beer further comprises a beer dispensing switch or an electronic payment device connected with the processor.

In an embodiment of the present application, the automatic isobaric dispensing machine for craft beer further comprises a lifting device including an electric telescopic mechanism installed on the housing and connected with the processor, and a lifting plate connected with a telescopic rod of the electric telescopic mechanism; wherein the lifting plate is arranged under the beer dispensing head and provided with a bracket or a clamp for placing the container; wherein the bracket or clamp is positioned corresponding to the beer dispensing head such that when the container is placed on the bracket or clamp and the lifting plate is raised upward, the beer dispensing head will fall into the container mouth of the container.

In an embodiment of the present application, the beer dispensing head further comprises an input end and an output end which are distributed one above the other in a perpendicular direction and communicated with each other, and a sealing gasket arranged between the input end and the output end; wherein the beer inlet, the gas inlet and the gas exhaust outlet are arranged on the input end, the output end has a cone shape which is convenient for inserting into the container; wherein when the beer dispensing head falls into the container mouth of the container, the output end is located in the container and the container mouth of the container abuts tightly against the sealing gasket.

In a further aspect, a beer dispensing method by using the above discussed automatic isobaric dispensing machine for craft beer is provided, which comprising following steps:

S1. inserting the beer dispensing head into the container mouth of the container;

S2. turning on the pre-pressure gas valve to inject the carbon dioxide into the container through the beer dispensing head, and turning off the pre-pressure gas valve when a gas pressure in the container is equal to that of the beer barrel;

S3. turning on the beer outlet valve of the beer barrel and the gas exhaust outlet of the beer dispensing head to gradually release the gas pressure of the container and flow beer in the beer barrel to the container;

S4. turning off the beer outlet valve when the beer flow of the beer barrel reaches a preset value;

S5. separating the beer dispensing head from the container when the gas pressure in the container is close to an atmospheric pressure.

In an embodiment of the present application, the automatic isobaric dispensing machine for craft beer comprises a plurality of beer barrels filled with different tastes of beer, a beer selection knob and a capacity selection knob connected with the processor; wherein each beer barrel is provided with one corresponding beer outlet valve at its outlet, the beer dispensing head is connected with each beer outlet valve via a common pipeline with a flowmeter arranged inside;

wherein step S1 further comprises rotating the beer selection knob to select a beer taste and rotating the capacity selection knob to select a container capacity; step S3 further comprises controlling the beer outlet valve of corresponding beer barrel to be turned on according to a selected beer taste and container capacity by the processor and measuring the beer flow by the flowmeter.

In an embodiment of the present application, the automatic isobaric dispensing machine for craft beer further comprises a beer dispensing switch or an electronic payment device connected with the processor; wherein the beer dispensing method further comprise following steps implemented before step S1 that turning on the beer dispensing switch to send an beer dispensing instruction, or scanning a two-dimensional code show in a screen of the electronic payment device and making a payment for sending the beer dispensing instruction to the processor by the electronic payment device.

Compared with the prior art, the automatic isobaric dispensing machine for craft beer and the beer dispensing method by using the above discussed automatic isobaric dispensing machine for craft beer of the present application has the following beneficial effects. One beer dispensing head can be used to provide different tastes of beer, which can greatly reduce the occupied area of the machine. An automatic filling of beer into the container can be realized and the pressure releasing process is slow and controllable. The whole beer dispensing process would not produce too much foam and the dispensing speed is faster than that of the traditional beer dispensing machine. In such a way, the time cost is lower, the beer waste is less, and the original taste of the beer can be guaranteed. The containers with different materials and different shapes can be supported. The automatic isobaric dispensing machine for craft beer of the present application has a simple structure and is convenient to use. Due to its compact shape, it can be placed on the table or fixed on the wall during the using.

BRIEF DESCRIPTION OF THE DRAWINGS

The present application will be further described in combination with the accompanying drawings and embodiments.

DETAILED DESCRIPTION OF THE PREFERRED EMBODIMENT

To make the object, the technical solution, and the advantage of the present application more clearly, the present application is further described in detail below with reference to the accompanying drawings and embodiments. It should be understood that the specific embodiments described herein are merely used to explain the present invention and are not intended to the present application.

Figure 1:
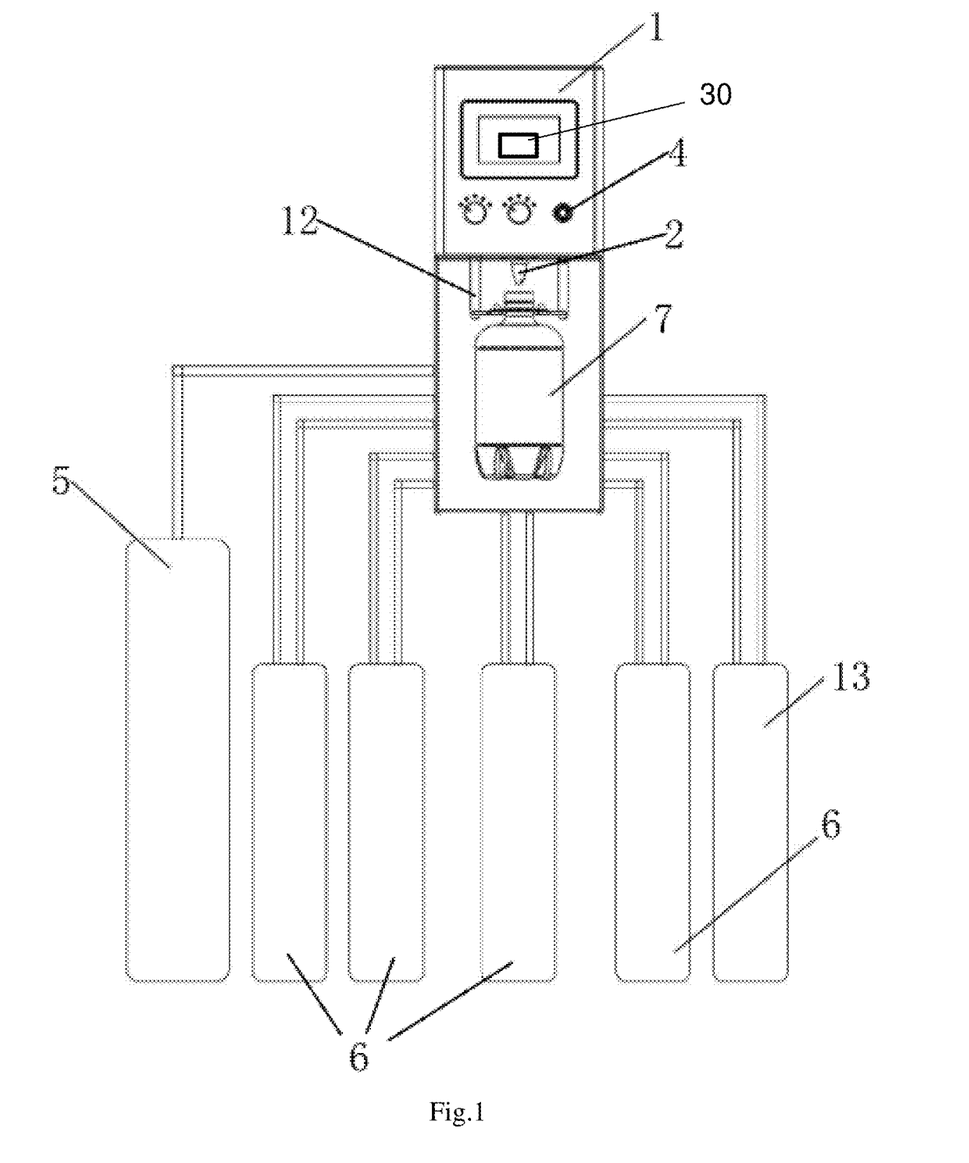
FIG. 1 is a structural diagram according to an embodiment of the present application.
Figure 2:
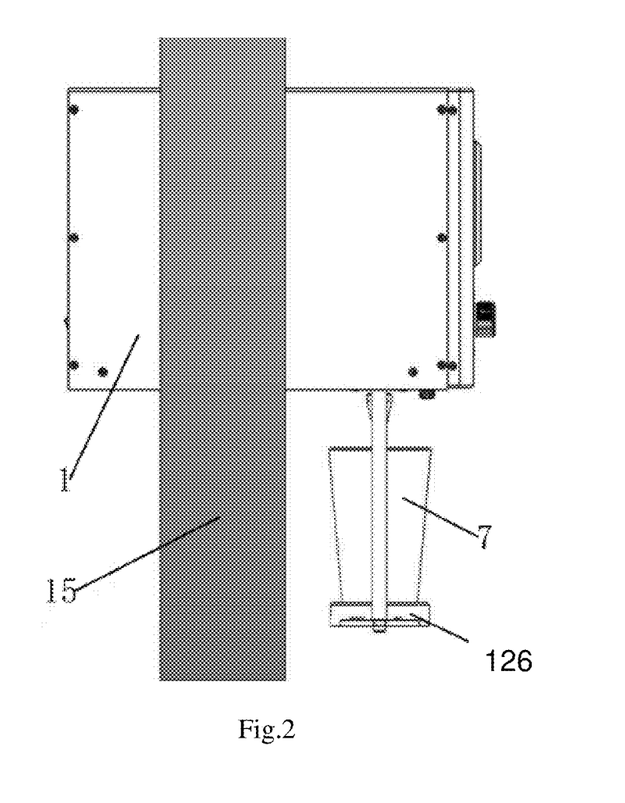
FIG. 2 is a structural diagram according to an embodiment of the present application when installed on a wall.
Figure 3:
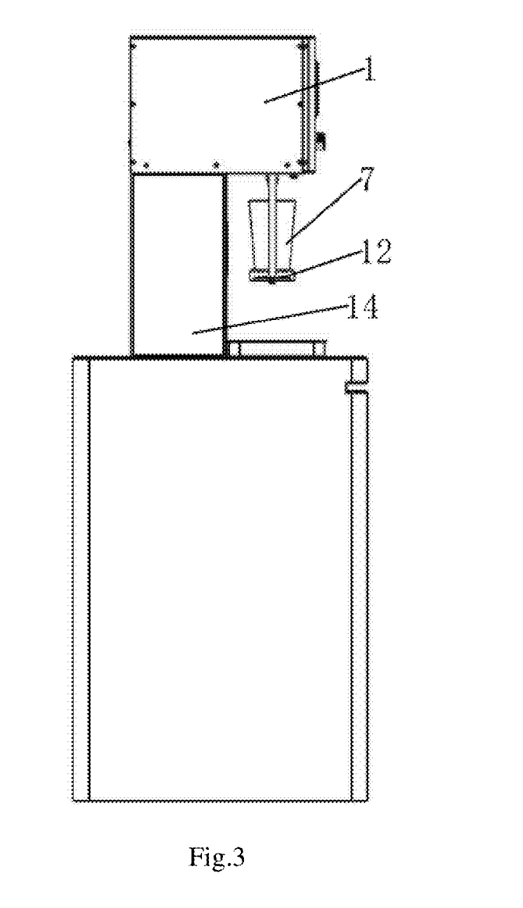
FIG. 3 is a structural diagram according to an embodiment of the present application when installed on a wall.
Figure 4:
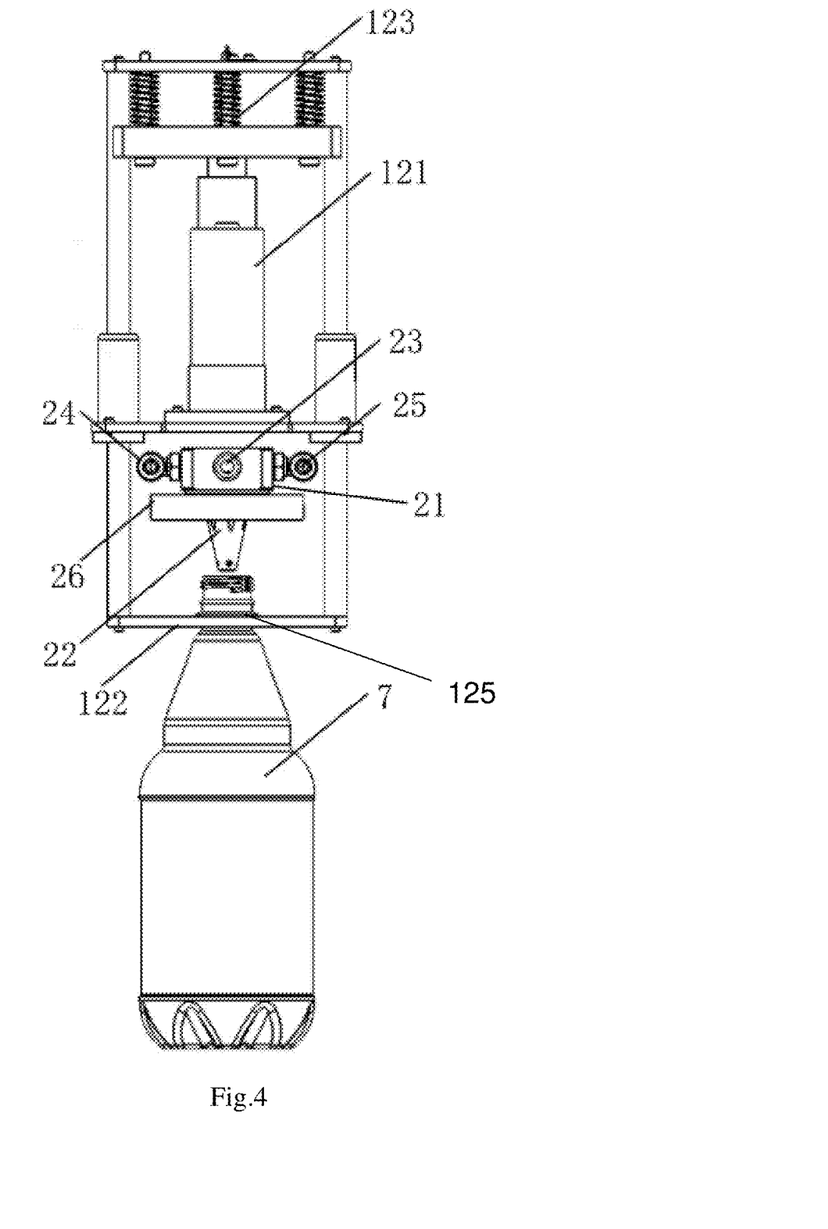
FIG. 4 is a structural diagram according to an embodiment of the present application when installed on a fixed base.

As shown in FIG. 1, the present embodiment has provided an automatic isobaric dispensing machine for craft beer which comprising a housing 1, and a beer dispensing head 2 installed on the housing 1, a beer dispensing switch 4 or an electronic payment device 16, a processor 30, a carbon dioxide supplying device 5 used as the gas source and a beer barrel 6. As shown in FIGS. 2 and 3, the housing 1 can be installed on a fixed base 14 at the bottom or directly on the wall 15. As shown in FIG. 4, the beer dispensing head 2 further comprises an input end 21 and an output end 22 which are distributed one above the other in a perpendicular direction and communicated with each other, and a sealing gasket 26 arranged between the input end 21 and the output end 22. The input end 21 is arranged with a beer inlet 23 connected with the beer barrel 6, a gas inlet 24 connected with the carbon dioxide supplying device 5 and a gas exhaust outlet 25 for discharging gas. The output end 22 is arranged downward and has a cone shape which is convenient for inserting into the container (such as the beer bottles, cups and so on). When the beer dispensing head 2 falls into the container mouth of the container 7, the output end 22 is located in the container 7 and the container mouth of the container 7 abuts tightly against the sealing gasket 26, such that the beer dispensing head 2 is hermetically located at the container mouth of the container 7 and can be used for inputting gas and beer into the container 7 via the beer inlet 23 and the gas inlet 24. The beer dispensing head 2 is further provided with a gas exhaust valve 34 for controlling an opening operation and a closing operation of the gas exhaust outlet 25, and a barometer 35 for measuring a gas pressure in the container 7. The carbon dioxide supplying device 5 is connected with the gas inlet 24 of the beer dispensing head 2 through a pre-pressure gas valve 31, while the beer barrel 6 is connected with the beer inlet 23 of the beer dispensing head 2 through a beer outlet valve 32. The processor 30 is connected with the pre-pressure gas valve 31, the beer outlet valve 32, the flowmeter 33, the gas exhaust valve 34 and the barometer 35 for receiving data measured by the flowmeter 33 and the barometer 35 and controlling the pre-pressure gas valve 31, the beer outlet valve 32 and the gas exhaust valve 34 to turn on and off. When the beer dispensing head 2 is inserted into the container mouth of the container 7 and sealed, the pre-pressure gas valve 31 is controlled to be turned on by the processor 30 for injecting the carbon dioxide from the carbon dioxide supplying device 5 into the container 7. When the gas pressure in the container 7 is equal to that of the beer barrel 6, the processor 30 controls the pre-pressure gas valve 31 to be turned off and instead control the beer outlet valve 32 to be turned on. As the gas pressure in the container 7 is equal to that of the beer barrel 6, the beer would not flow from the beer barrel 6 to the container 7 even the beer outlet valve 32 is turned on. At this time, the processor 30 control the gas exhaust valve 34 of the beer dispensing head 2 to be turned on for releasing the gas pressure in the container 7. The gas pressure inside the container 7 would be reduced and the beer would flow from the beer barrel 6 to the container 7. As there is a smaller pressure difference, basically no foam will be generated. At the same time, the flow rate of beer can be controlled by controlling the pressure difference, so that the flow rate of beer can be controlled by controlling the pressure difference. In such a way, the flow rate of beer during the filling process can be controllable. When the beer flow of the beer barrel 6 reaches a preset value, the beer outlet valve 32 is turned off by the processor 30. Then the gas exhaust valve 34 is continuously turned on by the processor 30 for releasing the gas pressure in the container 7. When the gas pressure in the container 7 is close to an atmospheric pressure, the beer dispensing head 2 is separated from the container 7. In such a way, one time of beer dispensing is accomplished.

Figure 5:
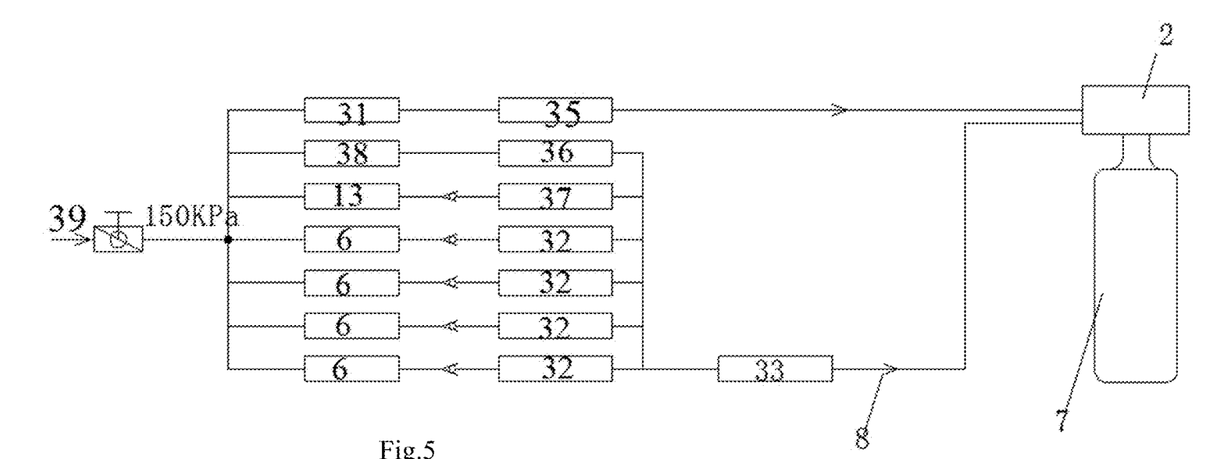
FIG. 5 is a structural diagram of a beer dispensing head and a lifting device in an embodiment of the present application.
Figure 6:
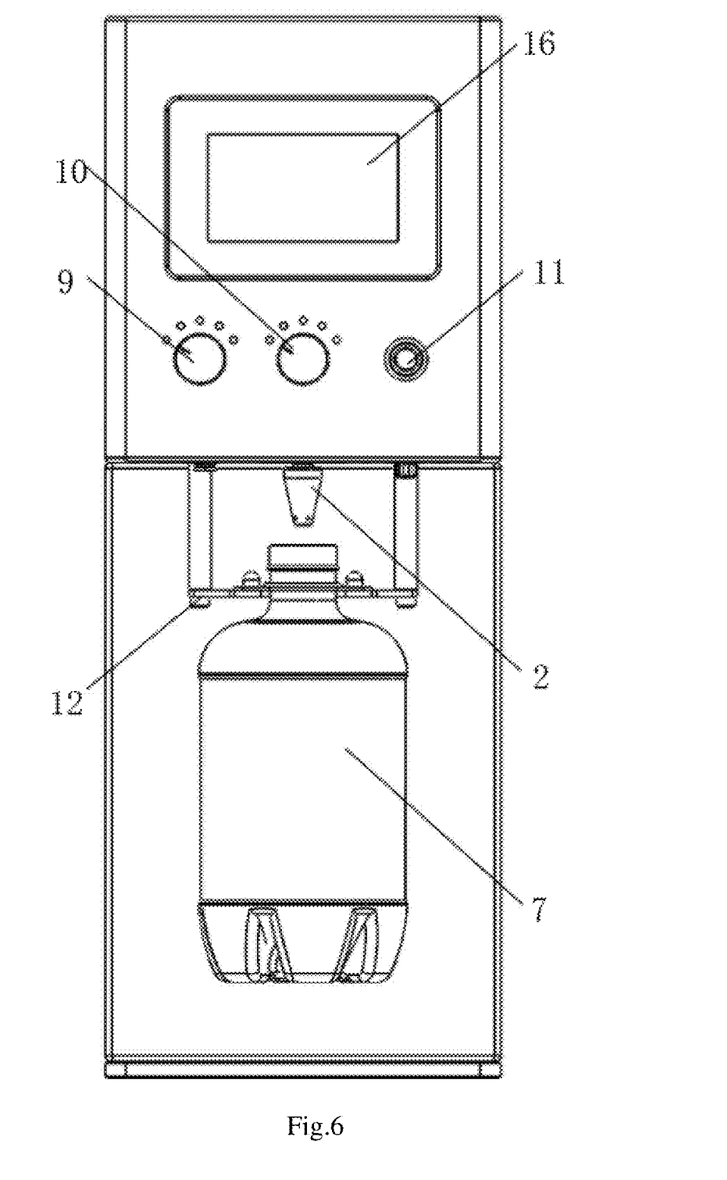
FIG. 6 is a front structure diagram according to the embodiment of the present application.

Furthermore, as shown in FIGS. 5-6, a plurality of beer barrels 6 filled with different tastes of beer are provided, and each beer barrel 6 is provided with one corresponding beer outlet valve 32 at its outlet. The beer dispensing head 2 is connected with each beer outlet valve 32 via a common pipeline 8 with a flowmeter 33 arranged inside. Preferably, the automatic isobaric dispensing machine for craft beer further comprises a beer selection knob 9 and a capacity selection knob 10. By rotating the capacity selection knob 9, the selected corresponding beer outlet valve 32 of the beer barrel 6 can be turned on. By rotating the capacity selection knob 10, the beer flow can be selected. In order to make the automatic isobaric dispensing machine for craft beer available for personal user or as a vending machine, the automatic isobaric dispensing machine for craft beer in the present embodiment further comprises a beer dispensing switch 11 or an electronic payment device 16. The personal user can initiate the beer dispensing procedure of the processor 30 by pressing the beer dispensing switch 11, which is simple and easy to use. When the automatic isobaric dispensing machine for craft beer is used as a vending machine, the beer dispensing procedure can be initiated by scanning a two-dimensional code show in a screen of the electronic payment device and making a payment. In such a way, an unmanned vending machine can be obtained.

The automatic isobaric dispensing machine for craft beer of the present embodiment further comprises a lifting device 12 including an electric telescopic mechanism 121 installed on the housing 1 and connected with the processor 30, and a lifting plate 122 connected with a telescopic rod 124 of the electric telescopic mechanism 121. The processor 30 is used for controlling the electric telescopic mechanism 121 to move upward and downward telescopically. The telescopic movement of the electric telescopic mechanism 121 brings the lifting device 12 to move upward and downward. The lifting plate 122 is arranged under the beer dispensing head 2 and provided with a bracket 126 or a clamp 125 for placing the container 7. The bracket 126 or clamp 125 is positioned corresponding to the beer dispensing head 2 such that when the container 7 is placed on the bracket 126 or clamp 125 and the lifting plate 122 is raised upward, the beer dispensing head 2 will fall into the container mouth of the container 7 and make the container mouth of the container 7 to abut tightly against the sealing gasket 26 for achieving a good sealing. In order to prevent the container mouth of the container 7 from being over pressured and broken, the lifting device 12 is installed on the housing 1 through a pressure spring 123 in the embodiment, and the sealing gasket 26 adopts a silica gel sealing gasket. Specifically, the electric telescopic mechanism 121 can be an electric cylinder or an electric push rod. The electric telescopic mechanism 121 is installed on the housing 1 through a device support plate and the pressure spring 123. The lifting plate 122 is fixedly connected with the output end 22 of the electric telescopic mechanism 121 through a structural frame. The lifting device 12 can realize the automatic docking and sealing between the container 7 and the beer dispensing head 2, making the operation more simple and convenient.

When the beer flow of the beer barrel 6 reaches a preset value, the beer outlet valve 32 is turned off. But now, there are still some beer residues in the common pipeline 8 and the pipeline of the beer dispensing head 2. When the user changes another taste of beer, the beer residues in the common pipeline 8 and the beer dispensing head 2 will be mixed into the container to affect the taste of the beer, making the beer flavor bad. Moreover, if the beer dispensing machine has not been used for a long time, the beer in the common pipeline 8 and the beer dispensing head 2 may deteriorate, such that the deteriorated beer in the pipeline will be mixed into the container in the next use, which is not good for human health. In order to solve this problem, the embodiment also includes a gas source connected with the common pipeline 8 through a residual gas valve 36 which is connected with the processor 30. A manual pressure regulating valve 38 is arranged between the common pipeline 8 and the residual gas valve 36. When the beer dispensing head 2 is separated from the container beer 7 after the completion of the beer dispensing, the processor 30 controls the lifting device 12 to move down slightly, so that the sealing gasket 26 is separated from the container mouth of the container 7, but the output end 22 is still inside the container mouth. At this time, the processor 30 controls the residual gas valve 36 to be turned on, such that the gas in the gas source 39 is delivered into the common pipeline 8 and the beer dispensing head 2 for blowing the residual beer in the pipeline into the container 7. After that, the container 7 is manually taken away to complete the beer dispensing process. In order to ensure the safety and health of the common pipeline 8 and the beer dispensing head 2, the present embodiment also includes a sterilizing liquid barrel 13 connected with the common pipeline 8 and the beer dispensing head 2 through a sterilizing liquid valve 37. After the use of the automatic isobaric dispensing machine for craft beer, there are still some residual beer on the inner wall of the common pipeline 8 and the beer dispensing head 2. This residual beer is easy to breed bacteria and microorganisms and affect food safety. In this embodiment, the automatic isobaric dispensing machine for craft beer can turn on the sterilizing liquid valve 37 before each use, so that the sterilizing liquid in the sterilizing liquid barrel 13 can wash the common pipeline 8 and the beer dispensing head 2 for a period of time, thus conducting a thorough sterilization on the common pipeline 8 and the beer dispensing head 2 to ensure the health and safety of the isobaric dispensing machine.

Figure 7:
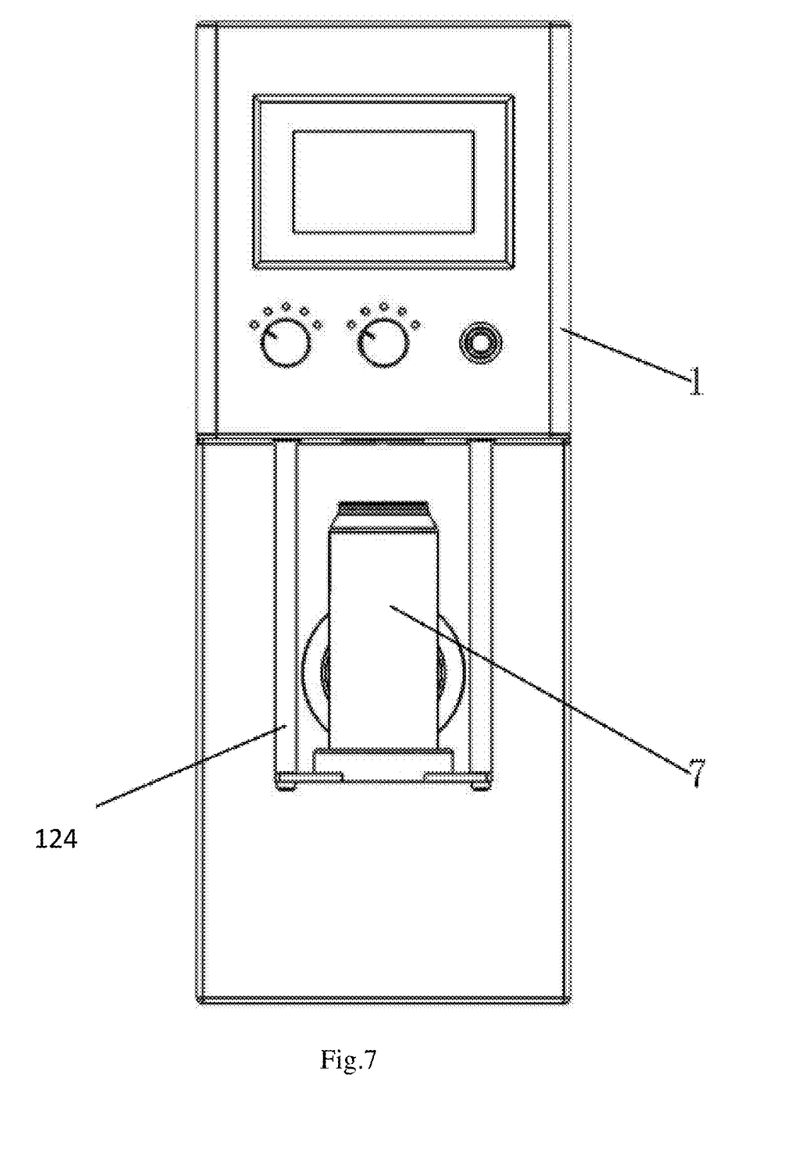
FIG. 7 is a first structural diagram of different containers in the embodiment of the present application.
Figure 8:
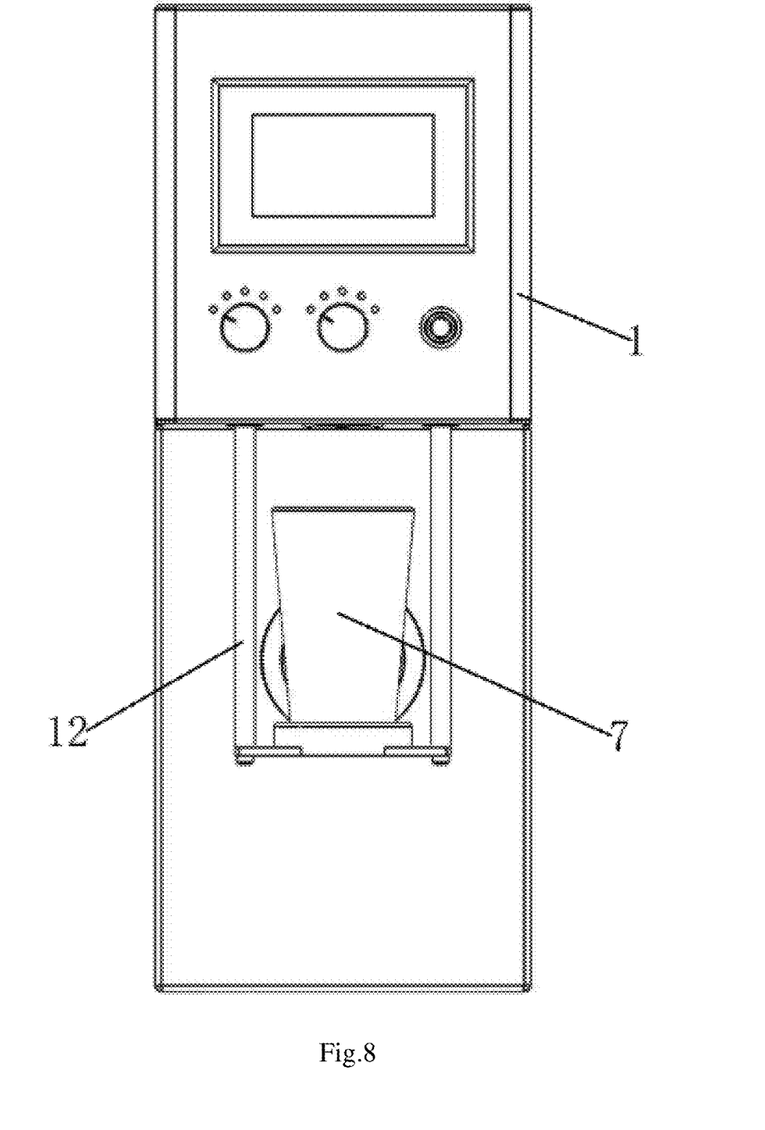
FIG. 8 is a second structural diagram of different containers in the embodiment of the present application.

As shown in FIG. 7 and FIG. 8, the container 7 in the embodiment can support containers of different materials and shapes, such as plastic bottles, glass bottles, aluminum cans, glasses, etc. The sealing gasket 26 on the beer dispensing head 2 can be designed according to the shape and size of the container mouth of the container 7. The processor 30 can be a single-chip microcomputer, an industrial computer or a PLC controller. Preferably, the processor 30 in the embodiment adopts a Siemens CPU226XP controller. At the same time, the computer program of the present application belongs to a simple program which can easily realize its function by using the existing development platform and the familiar programming method, and does not belong to the improvement of the computer program itself, so it will not be described here.

In a further aspect, a beer dispensing method by using the above discussed automatic isobaric dispensing machine for craft beer is provided, which comprising following steps.

In step S1, the container 7 is placed on the bracket 126 or clamp 125 of the lifting plate 122, the beer selection knob 9 is rotated to select the beer taste and the capacity selection knob 10 is rotated to select the container capacity. Then the beer dispensing switch 4 is turned on to send a beer dispensing instruction. Or a two-dimensional code show in a screen of the electronic payment device 16 is scanned to make the payment, then the beer dispensing instruction is sent to the processor 30 by the electronic payment device 16. The processor 30 controls the electric telescopic mechanism 121 to move for lifting the lifting plate 122 to a fixed stoke, thus inserting the beer dispensing head 2 into the container mouth of the container 7 and hermetically contacting the container mouth with the sealing gasket 26.

In step S2, the processor 30 controls the pre-pressure gas valve 31 to be turned on for injecting the carbon dioxide from the carbon dioxide supplying device 5 into the container 7 through the beer dispensing head 2, and controls the pre-pressure gas valve to be turned off when a gas pressure in the container 7 is equal to that of the beer barrel 6 (such as 0.2 MPa).

In step S3, the processor 30 controls the beer outlet valve 32 in the pipeline of the selected beer barrel 6 to be turned on. As the gas pressure in the container 7 is equal to that of the beer barrel 6, the beer would not flow from the beer barrel 6 to the container 7 even the beer outlet valve 32 is turned on. At this time, the processor 30 control the gas exhaust valve 34 of the beer dispensing head 2 to be turned on for releasing the gas pressure in the container 7. The gas pressure inside the container 7 would be reduced and the beer would flow from the beer barrel 6 to the container 7. As there is a smaller pressure difference, basically no foam will be generated. At the same time, the flow rate of beer can be controlled by controlling the pressure difference, so that the flow rate of beer can be controlled by controlling the pressure difference, in such a way the flow rate of beer during the filling process can be controllable.

In step S4, when the flowmeter detects that the beer flow of the beer barrel reaches the container capacity, the beer outlet valve 32 is turned off by the processor 30.

In step S5, the gas exhaust valve 34 is continuously turned on by the processor 30 for releasing the gas pressure in the container. When the gas pressure in the container 7 is close to an atmospheric pressure (such as 0.02 MPa), the processor 30 controls the electric telescopic mechanism 121 to move for moving down the lifting device slightly, thus separating the container 7 from the beer dispensing head 2. The processor 30 controls the residual gas valve to turn on for a period of time (such as 5 seconds), such that the gas in the gas source can blow the residual beer in the pipeline into the container 7. After that, the electric telescopic mechanism 121 is controlled to move and bring the lifting plate 122 downward to the initial position. Then the container 7 is manually taken away to complete the beer dispensing process.

The automatic isobaric dispensing machine for craft beer and the beer dispensing method by using the above discussed automatic isobaric dispensing machine for craft beer of the present application has the following beneficial effects. One beer dispensing head can be used to provide different tastes of beer, which can greatly reduce the occupied area of the machine. An automatic filling of beer into the container can be realized and the pressure releasing process is slow and controllable. The whole beer dispensing process would not produce too much foam and the dispensing speed is faster than that of the traditional beer dispensing machine. In such a way, the time cost is lower, the beer waste is less, and the original taste of the beer can be guaranteed. The containers with different materials and different shapes can be supported. The automatic isobaric dispensing machine for craft beer of the present application has a simple structure and is convenient to use. Due to its compact shape, it can be placed on the table or fixed on the wall during the using.

The foregoing is a further detailed description of the present application in connection with specific preferred embodiments, and cannot be considered as that the specific implementation of the present application is limited to these illustrations. It will be apparent to those skilled in the art that any various modifications or substitutions may be made to the present application without departing from the spirit of the invention, and such modifications or substitutions should be considered as falling within the scope of the present application.

The invention claimed is:

1. An automatic isobaric dispensing machine for craft beer comprising a housing and a beer dispensing head installed on the housing and hermetically placed at a container mouth of a container, wherein the beer dispensing head is arranged with a beer inlet, a gas inlet, a gas exhaust outlet for discharging gas in the container, a gas exhaust valve for controlling an opening operation and a closing operation of the gas exhaust outlet, and a barometer for measuring a gas pressure in the container;

wherein the automatic isobaric dispensing machine for craft beer further comprises a carbon dioxide supplying device connecting with the gas inlet of the beer dispensing head through a pre-pressure gas valve, a beer barrel connected with the beer inlet of the beer dispensing head through a beer outlet valve, a flowmeter for measuring a beer flow of the beer barrel, and a processor connected with the pre-pressure gas valve, the beer outlet valve, the flowmeter, the gas exhaust valve and the barometer;

wherein the automatic isobaric dispensing machine for craft beer further comprises a plurality of beer barrels filled with different tastes of beer, and each beer barrel is provided with one corresponding beer outlet valve at an outlet of the beer barrel, the beer dispensing head is connected with each beer outlet valve via a common pipeline with a flowmeter arranged inside; wherein the automatic isobaric dispensing machine for craft beer further comprises a beer selection knob and a capacity selection knob.

2. The automatic isobaric dispensing machine for craft beer according to claim 1, wherein the automatic isobaric dispensing machine for craft beer further comprises a gas source connected with the common pipeline through a residual gas valve.

3. The automatic isobaric dispensing machine for craft beer according to claim 1, wherein the automatic isobaric dispensing machine for craft beer further comprises a sterilizing liquid barrel connected with the beer dispensing head through a sterilizing liquid valve.

4. The automatic isobaric dispensing machine for craft beer according to claim 1, wherein the automatic isobaric dispensing machine for craft beer further comprises a beer dispensing switch or an electronic payment device connected with the processor.

5. An automatic isobaric dispensing machine for craft beer comprising a housing and a beer dispensing head installed on the housing and hermetically placed at a container mouth of a container, wherein the beer dispensing head is arranged with a beer inlet, a gas inlet, a gas exhaust outlet for discharging gas in the container, a gas exhaust valve for controlling an opening operation and a closing operation of the gas exhaust outlet, and a barometer for measuring a gas pressure in the container;

wherein the automatic isobaric dispensing machine for craft beer further comprises a carbon dioxide supplying device connecting with the gas inlet of the beer dispensing head through a pre-pressure gas valve, a beer barrel connected with the beer inlet of the beer dispensing head through a beer outlet valve, a flowmeter for measuring a beer flow of the beer barrel, and a processor connected with the pre-pressure gas valve, the beer outlet valve, the flowmeter, the gas exhaust valve and the barometer;

wherein the automatic isobaric dispensing machine for craft beer further comprises a lifting device including an electric telescopic mechanism installed on the housing and connected with the processor, and a lifting plate connected with a telescopic rod of the electric telescopic mechanism; wherein the lifting plate is arranged under the beer dispensing head and provided with a bracket or a clamp for placing the container; wherein the bracket or clamp is positioned corresponding to the beer dispensing head such that when the container is placed on the bracket or clamp and the lifting plate is raised upward, the beer dispensing head will fall into the container mouth of the container.

6. The automatic isobaric dispensing machine for craft beer according to claim 5, wherein the beer dispensing head further comprises an input end and an output end which are distributed one above the other in a perpendicular direction and communicated with each other, and a sealing gasket arranged between the input end and the output end; wherein the beer inlet, the gas inlet and the gas exhaust outlet are arranged on the input end, the output end has a cone shape which is convenient for inserting into the container; wherein when the beer dispensing head falls into the container mouth of the container, the output end is located in the container and the container mouth of the container abuts tightly against the sealing gasket.

7. A beer dispensing method by using a discussed automatic isobaric dispensing machine for craft beer, wherein the automatic isobaric dispensing machine for craft beer comprises a housing and a beer dispensing head installed on the housing and hermetically placed at a container mouth of a container, wherein the beer dispensing head is arranged with a beer inlet, a gas inlet, a gas exhaust outlet for discharging gas in the container, a gas exhaust valve for controlling an opening operation and a closing operation of the gas exhaust outlet, and a barometer for measuring a gas pressure in the container; wherein the automatic isobaric dispensing machine for craft beer further comprises a carbon dioxide supplying device connecting with the gas inlet of the beer dispensing head through a pre-pressure gas valve, a beer barrel connected with the beer inlet of the beer dispensing head through a beer outlet valve, a flowmeter for measuring a beer flow of the beer barrel, and a processor connected with the pre-pressure gas valve, the beer outlet valve, the flowmeter, the gas exhaust valve and the barometer;

wherein the beer dispensing method comprises following steps:

S1. inserting the beer dispensing head into the container mouth of the container;

S2. turning on the pre-pressure gas valve to inject the carbon dioxide into the container through the beer dispensing head, and turning off the pre-pressure gas valve when a gas pressure in the container is equal to that of the beer barrel;

S3. turning on the beer outlet valve of the beer barrel and the gas exhaust outlet of the beer dispensing head to gradually release the gas pressure of the container and flow beer in the beer barrel to the container;

S4. turning off the beer outlet valve when the beer flow of the beer barrel reaches a preset value;

S5. separating the beer dispensing head from the container when the gas pressure in the container is close to an atmospheric pressure;

wherein the automatic isobaric dispensing machine for craft beer comprises a plurality of beer barrels filled with different tastes of beer, a beer selection knob and a capacity selection knob connected with the processor; wherein each beer barrel is provided with one corresponding beer outlet valve at an outlet of the beer barrel, the beer dispensing head is connected with each beer outlet valve via a common pipeline with a flowmeter arranged inside;

wherein step S1 further comprises rotating the beer selection knob to select a beer taste and rotating the capacity selection knob to select a container capacity; step S3 further comprises controlling the beer outlet valve of corresponding beer barrel to be turned on according to a selected beer taste and container capacity by the processor and measuring the beer flow by the flowmeter.

8. The beer dispensing method according to claim 7, wherein the automatic isobaric dispensing machine for craft beer further comprises a beer dispensing switch or an electronic payment device connected with the processor; wherein the beer dispensing method further comprise following steps implemented before step S1 that turning on the beer dispensing switch to send an beer dispensing instruction, or scanning a two-dimensional code show in a screen of the electronic payment device and making a payment for sending the beer dispensing instruction to the processor by the electronic payment device.

\* \* \* \* \*